United States Patent [19]

Batdorf

[11] Patent Number: 5,268,203
[45] Date of Patent: Dec. 7, 1993

[54] METHOD OF INTRODUCING AN INTEGRAL THERMO-BONDED LAYER INTO THE SURFACE OF A THERMOFORMED SUBSTRATE

[75] Inventor: Vernon H. Batdorf, Minneapolis, Minn.

[73] Assignee: H. B. Fuller Company, Arden Hills, Minn.

[21] Appl. No.: 948,139

[22] Filed: Sep. 18, 1992

Related U.S. Application Data

[60] Division of Ser. No. 857,090, Mar. 20, 1992, abandoned, which is a continuation of Ser. No. 429,174, Oct. 30, 1989, abandoned.

[51] Int. Cl.$^5$ .............................................. B05D 3/02
[52] U.S. Cl. .............................. 427/385.5; 264/510; 264/511; 264/553; 427/393.5; 427/421; 427/420; 427/428; 428/328; 428/517; 428/518; 428/521; 428/522
[58] Field of Search .................. 264/248, 290.2, 291, 264/299, 328.18, 331.11, 510, 511, 553; 427/385.5, 393.5, 420, 421, 428; 428/328, 334, 517, 518, 521, 522

[56] References Cited

U.S. PATENT DOCUMENTS

| | | | |
|---|---|---|---|
| 3,788,961 | 1/1974 | Buxton | 204/181 |
| 3,793,106 | 2/1974 | Grunwald et al. | 156/155 |
| 3,798,096 | 3/1974 | Grunwald et al. | 156/151 |
| 3,839,129 | 10/1974 | Neumann | 264/135 X |
| 3,864,147 | 2/1975 | Grunwald et al. | 117/47 A |
| 3,868,343 | 2/1975 | Stengle et al. | 260/29.4 R |
| 3,935,346 | 1/1976 | Stengle et al. | 427/385 |
| 3,960,181 | 6/1976 | Bauer et al. | 138/178 |
| 4,093,683 | 6/1978 | Harley | 264/25 |
| 4,139,026 | 2/1979 | Zack | 138/178 |
| 4,336,309 | 6/1982 | Jackel et al. | 428/447 |
| 4,350,739 | 9/1982 | Mohiuddin | 428/425.1 |
| 4,356,230 | 10/1982 | Emanuel et al. | 428/290 |
| 4,361,457 | 11/1982 | Keeler et al. | 156/224 |
| 4,422,996 | 12/1983 | Navin et al. | 264/255 |
| 4,463,780 | 8/1984 | Schultz et al. | 138/178 |
| 4,474,725 | 10/1984 | Sands | 264/510 |
| 4,553,308 | 11/1985 | Botsolas | 29/450 |
| 4,603,057 | 7/1986 | Ueno | 427/40 |
| 4,708,887 | 11/1987 | Baxter et al. | 427/118 |
| 4,737,390 | 4/1988 | Fricano et al. | 428/35 |
| 4,936,936 | 6/1990 | Rohrbacher | 427/393.5 |

OTHER PUBLICATIONS

Product Data on Parlon Chlorinated Rubber, Parlon Chemical Co., Inc. (no date available).
Product Disclosure of CPE Resins, Dow (no date available).

(List continued on next page.)

*Primary Examiner*—Michael Lusignan
*Attorney, Agent, or Firm*—Merchant, Gould, Smith, Edell, Welter & Schmidt

[57] ABSTRACT

The invention relates to a process of thermoforming thermoplastic substrates. More particularly the method of the invention relates to a method of thermoforming thermoplastic substrates wherein an integral coating is formed on the thermoplastic substrate that is resistant to removal of the coating. The novel coating method of the invention produces coated thermoplastic substrates wherein the coating is intimately bonded to the substrate. The coated substrates are hard, abrasion resistant, mold resistant, chemically resistant, and solvent resistant. The coating composition employs in a solvent base a pigment and a thermoplastic material compatible with the to be coated thermoplastic substrate. The thermoplastic material in cooperation with the pigment, solvent and other components of the coating composition after coating on the thermoplastic substrate, are heated to a thermoforming temperature and the thermoplastic material is intimately fused to the thermoplastic substrate surface.

29 Claims, No Drawings

OTHER PUBLICATIONS

Product data on Pliolite resins (no date available).
Product data on Elvacite © Acrylic Resins, duPont (no date available).
Product data on Ketone Solvents, Eastman Kodak Company (no date available).
Product data on Multiflow © Resin Modifier, Monsanto (no date available).
Product disclosure of Santicizer © 261 (alkylbenzyl phthalate) (no date available).
Product disclosure of Kronitex © phosphates, FMC (no date available).
Product disclosure of silicone defoamers, Dow Corning (no date available).
Product data on Drewfax © 0007 (anionic surfactant), Drew Chemical Corporation (no date available).
Product data on Stan-Tone © colors (pigments), Harwick Chemical Corporation (no date available).
Product data on Chroma-Chem © 844 colorants (pigments), Nuodex Inc. (no date available).
Product disclosure of Standard Paste No. 6205 aluminum pigment, Alcoa.
"Engineering Thermoforming Heats Up", Plastics Technology, Aug. 1989, pp. 44-47.
"Thermoforming PP—New Resins Make It Easier", Plastics Technology, Aug. 1989, pp. 50-53.
"Equipment Makers Roll Out New Packaging Machines", Plastics Technology, Aug. 1989, pp. 57-59.
Product data on UCAR ® Solution Vinyl Resins (no date available).
Product data on FPC Vinyl Solution Resins (no date available).
Product Disclosure of Rhenoflex (chlorinated polyvinyl chloride) (no date available).

METHOD OF INTRODUCING AN INTEGRAL THERMO-BONDED LAYER INTO THE SURFACE OF A THERMOFORMED SUBSTRATE

This is a division of application Ser. No. 07/857,090, filed Mar. 20, 1992, now abandoned, which is a continuation of application Ser. No. 07/429,174, filed Oct. 30, 1989, now abandoned.

FIELD OF THE INVENTION

The invention relates to the introduction of integral thermo-bonded layers into the surface of a thermoformed thermoplastic material. More particularly the invention relates to introducing an integral thermo-bonded clear or colored surface into a thermoplastic article that is shaped and formed in thermoforming processes from a thermoplastic sheet substrate and a coating composition formulated for bonding to a specific sheet material in the thermo-bonding processes disclosed herein.

BACKGROUND OF THE INVENTION

Thermoplastic parts are being used to replace metal in different applications where their weight and cost are lower than various metals that could be used. Plastic parts that are molded or thermoformed can be coated after being formed with various types of coatings, but typically these coatings will not adhere well to the plastic substrate and eventually flake off or are easily abraded off. There is also some difficulty obtaining uniform coverage on odd shapes.

Clear or colored, decorative or protective discrete coatings are cast from solvent-based coatings onto the surface of objects made of thermoplastic materials. Such coatings have conventionally been introduced by applying solvent-based paints or coating compositions onto the surface of preformed thermoplastic objects. The coating layers are discrete coatings which means the paint, after solvent volatilization, creates a coating that rests upon the surface of the thermoplastic substrate without intimate bonding between the polymers of the substrate and the coating composition. Such paints have been used to form coatings on a variety of materials made in a variety of thermoplastic processes such as injection molding, thermoforming, blow molding, etc.

In conventional thermoforming processes, sheet thermoplastic material is cut to a predetermined size, introduced into a thermoforming machine, is heated and formed into a desired shape or geometry. Once the thermoformed article is shaped, coatings have commonly been applied through spray-on, brush-on, curtain coating, or other application technology. Such conventional technology using typical solvent-based paint formulations form discrete coatings on the surface of the thermoformed objects. Such paint formulations contain in a solvent base common polymeric bonding agents, pigments and other common paint ingredients. The formation of such coatings is desirable in order to provide an attractive colored appearance, informational legends, or protection from scratches or other mechanical insult. Such coatings are not intimately bonded or integral with the underlying thermoplastic matrix. Such solvent-based paints have been used for many years. However, the discrete coatings obtained from these paints commonly are not sufficiently resistant to chip, scratch or other coating removal mechanisms such as weathering. Such discrete coatings are easily removed in day-to-day use through relatively minor mechanical impact from day-to-day wear and tear.

BRIEF DISCUSSION OF THE PRIOR ART

A number of solutions to the coatings problem have been attempted. The texture of the surface of the underlying thermoplastic substrate has been altered through mechanical abrasion, chemical treatment, etc. to introduce areas of increased adhesion to the integral coatings.

Additives have been added to the coating to attempt to increase the discrete layer bond strength to the underlying substrate. The use of curing chemicals such as epoxy compositions, polyurethane compositions, aminoplast resins, phenoplast resins, etc. have been introduced into the coatings to increase cohesiveness in the coating and adhesivity to the underlying thermoplastic substrate.

Grunwald et al, U.S. Pat. Nos. 3,793,106 and 3,798,096 teach forming a thermoplastic layer on an aluminum surface, removing the aluminum and applying coatings onto the receptive revealed plastic surface. Grunwald et al relies on the tendency of the newly revealed surface produced by removing the aluminum substrate to be highly receptive to the addition of coatings to increase bond strength.

Buxton, U.S. Pat. No. 3,788,961 teaches a method of producing a plastic coating on an article by placing the plastic article in an electrolyte in an electrophoretic cell. The electrolyte includes a codispersion of a plastic material and a finely divided particulate solid material that through the passage of an electric current forms a thick coating layer of plastic and solid particulate on the article.

Neumann, U.S. Pat. No. 3,839,129 teaches the formation of reflective surfaces on molded objects from foil materials by forming a laminate comprising substrate metal layer and protective film wherein the film is used in in-mold molding processes by introducing a metallic layer containing a foil and a thermoplastic substrate.

Grunwald et al, U.S. Pat. No. 3,864,147 teaches a process for modifying the surface of a polymer substrate to improve bonding capacity to coatings such as metal films, paints and inks. The procedure involves laminating a sacrificial metal foil onto the surface, chemically removing the foil and simultaneously developing a network of microscopic fissures and cracks which improves the tendency of the surface to bond to coatings, films, paints and inks.

Stengle et al, U.S. Pat. Nos. 3,868,343 and 3,935,346 teach a process and compositions for coating polymeric substrates such as polycarbonates and acrylics with a curable material that provides a hard abrasion resistant, mar resistant, chemical resistant and acetone resistant adhered coating. Stengle uses an alkyl alcohol, melamine formaldehyde, and condensation products that are blended with organopolysiloxanes which cure to form an adherent coating.

SUMMARY OF THE INVENTION

We have found that integral, mechanically bonded coatings can be formed in thermoplastic processes by applying to sheet-like thermoplastic materials, a coating composition comprising a polymeric material compatible with the underlying thermoplastic substrate along with a solvent and a desired powdered pigment or other coating material. After the solvent is removed, the compatible thermoplastic polymer becomes plastic or softens and fuses during a thermoforming step to form an integral coating mechanically melt-bonded and intimately introduced into the thermoplastic surface by the thermoforming thermal process. We have further found that compatible thermoplastic polymeric materials are most active in forming such integral coatings during the thermoforming step. Non-compatible materials fail to provide sufficient melt mixing or other interaction, at the coating/thermoplastic surface interface, during thermoforming to form an integral coating. By compatible thermoplastic we mean materials that are compositionally the same as or sufficiently similar to the thermoplastic substrate to form a compatible melt mixture.

In somewhat greater detail, compatible thermoplastics for use in the coating compositions of the invention are typically chemically similar to the polymer in the thermoplastic substrate. In other words, in a coating composition prepared for a polyvinyl chloride substrate, a polyvinyl chloride polymer or copolymer will be dispersed or dissolved in the solvent phase in conjunction with the pigment or other coating material. In the coating of a polystyrene material, a polystyrene polymer or copolymer will be introduced into the coating material, etc. While the selection of chemically similar polymers for the coating and substrate is the most straightforward method of finding compatible coatings for the substrate, chemically dissimilar polymeric materials can be found that are compatible with the underlying substrates through procedures discussed below.

The term thermo-bonding or thermo-bonded means in thermoforming processes, a coating applied to a thermoplastic sheet is bonded to the sheet through a thermal process and the coating becomes an integral layer by thermal action resulting in a fusing-of coating polymer and substrate polymers.

The term integral coating means a coating that during the thermoforming process becomes intimately bonded and mechanically fused at the interface between the coating material and the underlying substrate through a melt fusion process in which the coating is no longer separate from the underlying substrate.

The term discrete coating layer means a coating layer that is merely surface to surface joined to the underlying substrate, with no melt fusion occurring. However, depending on the nature of the substrate, some mechanical bonding can be present, but there is little or no intimate involved fusion of the coating layer and substrate.

By compatible we mean with respect to two polymeric materials, that the materials when blended tend to form a homogeneous mixed melt that has no tendency to phase or separate.

DETAILED DESCRIPTION OF THE INVENTION

The invention resides in a method for introducing a thermo-bonded coating into the surface of a thermo-formed substrate. The coating method of the invention produces coated thermoplastic substrates that are hard, abrasion resistant, and solvent resistant.

Thermo-Forming Processes

Thermo-forming is a process for converting a plastic sheet into parts, e.g., a tray for packaging meat, egg cartons, etc. There are three basic methods of thermoforming: vacuum, pressure forming (compressed air), and mechanical.

The vacuum forming process is the most popular thermoforming method. A thermoplastic sheet is clamped in a frame and is brought close to radiant electric heaters. The sheet is softened to a formable condition and is then moved to and down over a mold. The molten resin is sucked against the mold by vacuum which quickly- removes the air between the mold and the sheet. The plastic sheet is held against the mold until it cools below the heat distortion temperature. Excess plastic is then trimmed from the part and is recycled. The hotter the mold and the faster the vacuum/air pressure the better material distribution will be. However, exceeding the required mold temperature should be avoided.

Pressure forming or compressed air is used any time pressures greater than atmospheric (14.7 psi) are required. More pressure is used to obtain better detail, closer tolerances, faster cooling cycles, more strain-free parts, better distribution of sheet material and tighter tolerances. Common pressures used are about 50 psi. In free pressure forming, a hot plastic sheet is sealed over a blow box so only the periphery of the sheet is in contact with any tooling. Compressed air is injected into the box, pressurizing the sheet into the desired configuration. The bubble height of the plastic can be controlled with a photocell or microswitch, timed or "eyeballed". Normal blowing pressures are from 20 to 120 psi.

In the mechanical forming process, there is no vacuum or compressed air to move the plastic sheet. The forces necessary to move the sheet are applied by mechanical or manual stretching, bending, compressing, stamping or a pressure blanket. One technique is stretch forming, in which the hot plastic sheet is stretched mechanically or by hand over or around a mold and clamped in place for cooling. Another technique is using matched molds in which the heated plastic sheet is compression molded between two matching molds. Foams, along with filled and fiber reinforced materials, are frequently processed this way. Another technique, strip heating, is the easiest method for forming along a straight line. Using this method, it is possible to thermoform parts and then, as a post operation, strip form sections to obtain a more uniform wall thickness and smaller beginning blank size. This process lends itself to fast production of simple containers, store display fixtures, furniture, and many industrial items.

Thermo-forming Heat Requirements

During the forming process temperature and vacuum and/or compressed air are critical factors. Any variation in temperature of the hot plastic sheet will greatly affect the "hot strength" or elasticity (tensile) of the plastic. Under normal conditions it is essential that the sheet material be heated very uniformly throughout. With this type of heat, the faster the vacuum the better will be the material distribution as the sheet does not have a chance to cool off as it is being formed. This produces a minimum of internal stress and will supply finished parts with the best possible physical properties. When pressure forming is used and the material is moved even faster than by vacuum, the material distribution will be better and the parts even more stress-free. All thermoplastic materials have specific processing temperatures. Table I shows the various temperature ranges for some thermoplastic materials.

TABLE I

THERMOFROMING PROCESS TEMPERATURE RANGES

| Material | Mold and Set Temperature °F. | Mold and Set Temperature °C. | Lower Processing Limit °F. | Lower Processing Limit °C. | Orienting Temperature °F. | Orienting Temperature °C. | Normal Forming (Core) Temperature °F. | Normal Forming (Core) Temperature °C. | Upper Limit °F. | Upper Limit °C. |
|---|---|---|---|---|---|---|---|---|---|---|
| ABS | 185 | 85 | 260 | 127 | 280 | 138 | 300 | 149 | 360 | 182 |
| Acetate | 160 | 71 | 260 | 127 | 280 | 138 | 310 | 154 | 360 | 182 |
| Acrylic | 185 | 85 | 300 | 149 | 325 | 163 | 350 | 177 | 380 | 193 |
| Acrylic/PVC (DKE-450[2]) | 175 | 79 | 290 | 143 | 310 | 154 | 340 | 171 | 360 | 182 |
| Butyrate | 175 | 79 | 260 | 127 | 275 | 135 | 295 | 146 | 360 | 182 |
| Polycarbonate | 280 | 138 | 335 | 168 | 350 | 177 | 375 | 191 | 400 | 204 |
| Polyester Thermoplastic (PETG[3]) | 170 | 77 | 250 | 121 | 275 | 135 | 300 | 149 | 330 | 166 |
| Polyethersulfone | 400 | 204 | 525 | 274 | 560 | 293 | 600 | 316 | 700 | 371 |
| Polyethersulfonate, glass filled | 410 | 210 | 535 | 279 | 560 | 293 | 650 | 343 | 720 | 382 |
| Polyethylene, high density | 180 | 82 | 260 | 127 | 270 | 132 | 295 | 146 | 360 | 182 |
| Propionate | 190 | 88 | 260 | 127 | 270 | 132 | 295 | 146 | 360 | 182 |
| Polypropylene | 190 | 88 | 265 | 129 | 280 | 138 | 310–330 | 154–166 | 331 | 166 |
| Polypropylene, glass filled | 195 | 91 | 265 | 129 | 280 | 138 | 400+ | 204+ | 450 | 232 |
| Polysulfone | 325 | 163 | 374 | 190 | 415 | 213 | 475 | 246 | 575 | 302 |
| Styrene | 185 | 85 | 260 | 127 | 275 | 135 | 300 | 149 | 360 | 182 |
| Teflon (FEP[1]) | 300 | 149 | 450 | 232 | 490 | 254 | 550 | 288 | 620 | 327 |
| Vinyl, rigid | 150 | 66 | 220 | 104 | 245 | 118 | 280–285 | 138–141 | 310 | 154 |
| Vinyl, rigid foam | 162 | 72 | 240 | 116 | 260 | 127 | 300 | 149 | 350 | 177 |

Registered Trademarks of:
[1] duPont,
[2] Polygast Corp.
[3] Eastman

The various temperature ranges of Table I are explained as follows:

Mold and Set Temperature: The set temperature is the temperature at which the thermoplastic sheet hardens and can be safely taken from the mold. This is generally defined as the Heat Distortion Temperature at 66 psi (455 kPa). The closer the Mold Temperature is to the Set Temperature, without exceeding it, the less you will encounter internal stress problems in the part. For a more rapid cycle time, if post shrinkage is encountered, post cooling fixtures can be used so that parts may be pulled early.

Lower Processing Limit: This column shows the lowest possible temperature for the sheet before it is completely formed. Material formed at or below this limit will have severely increased internal stress that later can cause warpage, lower impact strength and other poorer physical properties—another reason for rapid vacuum or forming pressure. The least amount of internal stress is obtained by a hot mold, hot sheet, and very rapid vacuum and/or compressed air.

Orienting Temperatures: Biaxially orienting the molecular structure of the thermoplastic sheet approximately 275 to 300% at these temperatures and then cooling greatly enhances properties, such as impact and tensile strength. Careful matching of heating, rate of stretch, mechanical stresses, etc. are required to achieve maximum results. When thermoforming oriented material, good clamping of the sheet must be used. The sheet is heated as usual to its proper forming temperature and thermoformed. The hot forming temperatures do not realign the molecular structure; therefore, the better properties of the oriented sheet are carried into the finished part.

Normal Forming Temperature: This is the temperature which the sheet should reach for proper forming conditions under normal circumstances. The core (interior) of the sheet must be at this temperature. The normal forming temperature is determined by heating the sheet to the highest temperature at which it still has enough hot strength or elasticity to be handled, yet below the degrading temperature.

Upper Limit: The Upper Limit is the temperature at which the thermoplastic sheet begins to degrade or decompose. It is crucial to ensure that the sheet temperature stays less than this amount. When using radiant heat the sheet surface temperature should be carefully monitored to avoid degradation while waiting for the "core" of the material to reach forming temperature. These limits can be exceeded, if for a short time only, with a minimum of impairment to the sheet properties.

Thermoforming Machines

There are many types of thermoforming machines having different features which can be used in the thermoforming process. Two of the more common machines are roll fed in-line machines and sheet-fed pressure machines. The machines generally have 50 psi compressed air and 29" of Hg vacuum available as a standard. In some plants, extrusion of sheet and vacuum-forming are integrated into a continuous process. Timers are utilized to control the length of the heating and cooling periods, which depend upon the composition and sheet thickness of the thermoplastic material. For deep molds with considerable surface area, stretching the molten plastic to fit the mold can be difficult. However, the molten sheet can be stretched by one of several methods prior to contact with the mold. Molds can be made of polished wood or thermosetting resins, but more frequently they are made of aluminum.

Thermoplastic Thermoforming Materials

Thermoplastic materials can be repeatedly softened by elevated heating and hardened by cooling. These resins are all linear, with many having slightly branched polymers. They consist of long molecules and each may have side chains or molecular groups not attached (not crosslinked). Newly developed thermoplastics can process as usual, but at the end of the process are crosslinked using special techniques (e.g., nucleating agent, hot mold above forming temperature, etc.). Thermoplastic materials can also be crosslinked by radiation which turns them into either an undeveloped or full thermoset which can greatly improve the physical properties of the thermoformed part.

Any thermoplastic resin that can be extruded or calendered into sheet or film can be thermoformed. However, those with low hot strength at the forming temperature may be very difficult to form. Sheet and film can be produced by extrusion, co-extrusion, continuous casting, extrusion casting, calendering, compression molding, autoclave and press laminating.

There are two phases of thermoplastics—amorphous and crystalline. In the amorphous phase, thermoplastics are devoid of crystallinity and have no definite order. Amorphous materials have a randomly ordered molecular structure, having behavior very similar to a very viscous, inelastic liquid. Upon heating, an amorphous sheet gradually softens and eventually acquires the characteristics of a liquid, but without a definite point of transition from solid to liquid state. Amorphous resins normally have better hot strength characteristics than crystalline resins and as a result form more easily. These resins usually require less energy to bring them to forming temperature and to cool than crystalline resins, but amorphous resins are never as easy-flowing as crystalline resins. When cooled, amorphous resins do not reach a totally "non-flowing" solid state and, therefore, have a tendency toward "creep" or "movement" with age when a load is applied. The following plastics are amorphous: ABS (acrylonitrile-butadiene-styrene), styrene, vinyl, acrylic, the cellulosics, and polycarbonates.

In the crystalline phase, thermoplastics have a very orderly group of molecules. Crystalline thermoplastic molecules have a natural tendency to line up in rigid, precise, highly-ordered structures like a chain link fence. This gives these resins good stiffness and low creep. Most of the crystalline materials used in thermoforming are also partly amorphous (e.g., polypropylene normally is about 65% crystalline and 35% amorphous). Unlike amorphous plastics, when crystalline sheet is heated it remains very stiff until it reaches he glass transition (Tg) temperature, the minimum forming temperature of the sheet, at which point the plastic softens. As the sheet continues to become hotter it rapidly becomes more fluid. The next condition to occur is the ideal forming temperature. Unfortunately, with most crystalline materials this is only a very few degrees below the melt temperature. Consequently, a lot of these resins have to be "cold" formed at the "orienting" temperature (see Table I) or a little bit above, allowing an excessive amount of internal stresses causing the lowering of the heat distortion point, warpage, less impact strength, etc. This is why these materials are very difficult to thermoform. However, the polypropylene resin suppliers have made tremendous chemistry advances only recently to correct this problem. There are now several excellent grades of crystalline thermoplastics that exhibit very good hot strength at the regular forming temperature (about 330° F.). The following are crystalline thermoplastic materials: nylon, polyethylene, polypropylene, polyphenylene sulfide, and acetal.

According to the method of the invention, a coating composition is applied to a surface of a thermoplastic substrate sheet. The coating composition employs in a solvent base a pigment and a thermoplastic solution grade polymer, copolymer, or terpolymer that is compatible with the thermoplastic substrate sheet. The polymer used in the coating is specifically chosen to be one that will thermofuse with the underlying thermoplastic substrate. When the coating composition is initially applied to the thermoplastic substrate, a discrete, wet coating is formed on the substrate having a thickness of between about 1-15 mils. This discrete coating layer can be formed by curtain coating, spraying, or roll coating the coating composition onto the surface of the thermoplastic substrate. After being dried or allowing for solvent flash off, the discrete coating has a thickness of between about 0.2-4 mils. The coated thermoplastic substrate is then heated to the thermoforming temperature of the thermoplastic substrate and the polymeric component of the coating composition at which point the coating and the substrate are sufficiently soft to promote melt fusion resulting in an integral coating. When the thermoforming temperature is reached, the plastic substrate and coating composition thermally fuse forming an integral coating that is mechanically multi-bonded and intimately introduced into the surface of the substrate by the shear force on the bond line caused by stretching forces. Compatible polymeric materials are most active in forming such integral coatings during the thermoforming step. Non-compatible materials fail to provide sufficient melt fusion during thermoforming to form an integral coating.

Typically compatible thermoplastics for use in the coating composition of the invention are chemically similar to the polymer used in the thermoplastic substrate. For example, in a coating composition prepared for a polyvinyl chloride substrate, a polyvinyl chloride polymer will be dispersed or dissolved in the solvent phase in conjunction with the pigment or other coating material. While the selection of chemically similar polymers for the coating and substrate is the most straightforward method of finding compatible coatings for the substrate, chemically dissimilar polymeric materials can be used that are compatible with the underlying substrate as discussed below.

The thermoplastic substrate used in the thermoforming process of the invention can include amorphous resins such as vinyl polymers, copolymers and mixtures thereof. These polymers can include polyvinyl chloride (PVC), polystyrene, and acrylic resins such as polymethyl methacrylate. These particular resins are useful because they soften but do not sag when heated. Sagging causes thinning of the resin and a sagged sheet may have more surface area than the mold, resulting in folds and areas of double thickness. Copolymers that can be employed in the substrate are ABS, ABS/polycarbonate, ABS/vinyl blend, acrylate-modified styrene-acrylonitrile, acrylic/vinyl blend, polyetherimide copolymer, polyvinylidene chloride/vinyl chloride, acrylonitrile copolymer, and acrylonitrile-ethylene-styrene. Cellulosics can also be employed in the invention such as CAB (cellulose-acetate-butyrate) and cellulose propionate. Other suitable materials are Teflon (fluorinated-ethylene-propylene), Surlyn, butadiene-styrene, nylon, polycarbonate, polyester, polyether sulfone, polyolefins, polyphenylene oxide, polyphenylene sulfide, polysulfone, and polyurethane. These polymeric materials have an average molecular weight of between about 2,000 and about 350,000 and are preferably within the range of from about 25,000 to about 250,000. A preferred polymer is PVC having an average molecular weight of about 50,000 to 350,000. The above-mentioned polymers are commercially available and methods for their preparation are well known in the art.

The compatible thermoplastic polymer of the coating composition can include the above mentioned polymers, copolymers and terpolymers or mixtures thereof. Preferred polymers for the coating composition include PVC, polystyrene, acrylic resins such as polymethyl methacrylate, and the copolymer of ABS. The compatible thermoplastic polymer can also include chemically dissimilar polymers that are still compatible with the underlying substrate. These polymers can include chlorinated rubber, chlorinated polyethylene, and chlorinated polyvinyl chloride. The weight average molecular weight of these polymers is from about 20,000 to about 250,000 and is preferably within the range of from about 25,000 to about 150,000. A preferred polymer for the coating composition is PVC having a molecular weight average of about 25,000 to about 50,000.

There are many types of pigments that can be incorporated into the coating composition of the invention to provide various desired colors. These include both inorganic and organic pigments. Inorganic pigments that can be used include white opaque pigments such as titanium dioxide ($TiO_2$), zinc oxide, zinc sulfide, antimony trioxide, etc.; brown and red pigments such as iron oxide, cuprous oxide, cadmium sulfoselenides, etc; orange and yellow pigments such as those derived from lead chromate, lead sulfate, lead/molybdate, zinc chromate, cadmium, barium chromate, etc.; green pigments such as chrome oxide, copper acetate, cobalt-zinc-alumina, etc.; blue pigments such as complex iron potassium or sodium cyanides, lead sulfate-lead sulfide-carbon, cobalt aluminate, etc. Black pigments that can be used are elemental carbon, graphite, black iron oxides, etc. Metallic powder and flake can also be used as pigments in the invention and include aluminum flake, bronze powders from various metals, lead powder, zinc dust, gold and silver as well as alloy powders.

Organic pigments can be used in the invention such as organic dyestuffs. Most pigments made from organic dyes include an extender or substrate as a means of obtaining the desirable physical properties of a pigment which are not present in a large proportion of the organic dyes used for making pigments. Even those dyes having the physical properties of a pigment are often diluted with extenders to obtain specific physical properties as well as to make them less costly. A great many natural or synthetic organic dyestuffs can be made into pigments by fixing them on an inert base pigment. Useful organic dyestuffs include yellow chloronitroaniline derivative, paranitraniline-beta-naphthol derivative (red), dinitraniline-beta-naphthol derivative (orange), azo compound derivatives, anthraquinones, indigoid derivatives, arylides of hydroxynaphthoic acid, arylides of acetoacetic acid, pyrazolone derivatives, etc.

One preferred inorganic pigment is flaking grade aluminum available as Standard Paste No. 6205 from Silberline Manufacturing. Using this pigment results in paint finishes having a smooth texture with a characteristic bright metallic color. Paints made from this pigment at concentrations of about 2 pounds per gallon give the best all-around durability and appearance. Other preferred pigments include various organic and inorganic pigments dispersed in dioctyl phthalate (DOP). These are available as Stan-Tone ® PC colors from Harwick Chemical Corporation. Preferred pigments for the invention are those that have good heat and light stability. The process of the invention also allows for the use of some very expensive light stable organic pigments that are not usually economically practical and would not be considered for compounding into the plastic substrate. However, it is economically feasible to use these pigments in a thin coating over the surface of a thermoplastic substrate by using the method of the invention.

The solvent employed in the coating composition helps to soften the plastic surface of the substrate providing a lower fusing temperature of the substrate and coating. The solvent choice is dependent on the particular thermoplastic resin's solubility characteristics. Solvents having solubility parameters similar to the resin need to be chosen for use in the invention and a true solvent will produce a clear solution. Diluent solvents may also be employed so long as the resin shows good tolerance for the solvent. Too much diluent can cause precipitation of the resin, cloudiness, or greatly increased viscosity. The primary solvent or solvents used in the invention need to be the highest boiling solvents so that they are the last to leave the coated substrate upon heating. For economy purposes the amount of diluent is maximized to a point before precipitation or polymer incompatibility.

Solvents that can be used in the invention are higher boiling ketones such as cyclohexanone, methyl ethyl ketone (MEK), methyl amyl ketone (MAK), methyl isobutyl ketone (MIBK), or methyl isoamyl ketone (MIAK). Other solvents that can be used are dimethylformamide (DMF), chlorinated solvents, acetates, toluene, or xylene.

Optional ingredients in tee coating composition can include stabilizers, plasticizers, and flow control additives. Stabilizers for the thermoplastic material that are useful in the invention are organotins such as Thermalite 31 and 813 from M&T Chemical, and Plastholl ESO (epoxized soy oil). There are many plasticizers available in the industry which provide lower melting points, improved fusing of coating materials, improved overall gloss and better workability of the coating. Plasticizers that are useful include triaryl phosphate available as Kronitex ® 100 from FMC Corp., alkyl benzyl phthalate available as Santicizer 261, and DOP. Flow control additives are used before thermoforming in applying the wet coating to the underlying plastic substrate. A useful additive is a xylene solution of ethyl acrylate and 2-ethylhexyl acrylate copolymer available as a 50% solution of ModaFlow ® resin modifier in xylene (Monsanto Co.).

Dispersants and defoamers are also useful in the invention. One such dispersant which is used to disperse pigments for improved color, as for $TiO_2$, is an anionic surfactant consisting of 70% active sodium dioctyl sulfosuccinate available as Drewfax ® 0007 (Drew Chemical Corp.). Antifoaming agents that can be used are silicone defoamers such as Dow Corning ® Antifoam A compound.

Therefore, the coating composition of the invention comprises about 60 to 85%, preferably about 65 to 75 % of a solvent; about 15–30%, preferably about 20–25% of a thermoplastic resin; about 3–20%, preferably about 5–10% of a pigment; about 0.05–1.0%, preferably about 0.2–0.7% of a stabilizer; about 0–9%, preferably about 2-6% of a plasticizer; about 0-1.2%, preferably about 0.2-0.6% of a flow control additive.

The coating composition has a viscosity of about 70 cps (centipoise) to 1,000 cps, and preferably about 100 to 300 cps.

The coated thermoplastic substrate can be heated in a thermoforming or molding process by radient heat rods, oven heating or microwave heating. The higher the temperature (to the upper limit), the more complete the fusing process will be. The temperature required for fusing the coating onto any given thermoplastic will depend on the softening point of the thermoplastic substrate and the polymer used in the coating. For example an aluminum containing coating composition can be fused to rigid PVC sheets at as low as about 200° F. Typical temperatures during the thermoforming process are about 260°-300° F. (See Table I.)

EXAMPLES

Of particular value is the coating of thermoplastic parts with an aluminum colored paint containing a flaking or non-flaking grade aluminum pigment. Three similar coatings (Examples 1-3) have been applied to a rigid PVC sheet by spray, and after allowed to dry, thermoformed into various shapes. The resulting aluminum color is bright, glossy, and matches very well to polished aluminum. Even though the parts are stretched during the thermoforming process, the coating remains uniform across the plastic part. The aluminum colored coating provides a high degree of weather resistance because of the high reflectivity of aluminum flake, preventing degradation of the coating and underlying thermoplastic substrate from heat and UV radiation.

The polymers chosen for the coatings in Examples 1-3 are copolymers of PVC which have exceptional weather resistance, and when used with the aluminum pigment, they will have many fold times the serviceability in exterior applications than other colored PVC parts. PVC plastic will typically fade in color, chalk, and lose physical properties after exposure to exterior weathering. Because of the protective shield of these durable coatings, the PVC plastic will retain its physical properties and appearance even after long term exterior exposure. If these coatings become scratched or stained in service, they can easily be recoated on the job site by brushing or spraying the coating over the existing surface, with the newly applied coating fusing onto the existing coated surface.

TABLE II

| Aluminum Coating Composition Examples 1-3 | |
|---|---|
| | Percentage Range |
| Solvent | 60-85% |
| Resin | 15-30% |
| Stabilizers (0.5-4 phr) | 0.05-1.0% |
| Aluminum Paste (25-75 phr) (65% Aluminum Flake in Solvent) | 6-30% |
| Plasticizer (0-25 phr) | 0-6% |
| Flow Control Additives (0-5 phr) | 0-1.2% |
| Example 1 | |
| Xylene | 42.0 |
| Methyl Ethyl Ketone (MEK) | 22.0 |
| FPC-471 Vinyl Resin (PVC, maleate ester) | 20.0 |
| Plastholl ESO (epoxy soy oil stabilizer for PVC) | 0.3 |
| Thermalite 813 (PVC heat stable organotin) | 0.1 |
| Aluminum Flake 6205 (50 phr) | 15.4 |
| Anti-Terra U (flow control agent | 0.2 |
| 30.4 solids, 200-250 cps | 100.00 |
| Example 2 | |

TABLE II-continued

| Aluminum Coating Composition Examples 1-3 | |
|---|---|
| | Percentage Range |
| Xylene | 35.2 |
| MEK | 35.0 |
| VAGH Vinyl Resin (PVC, vinyl acrylate, vinyl alcohol) | 8.33 |
| VMCH Vinyl Resin (PVC, vinyl acrylate, maleic acid) | 8.33 |
| Plastholl ESO | 0.25 |
| Thermalite 813 | 0.08 |
| Aluminum Flake 6205 (50 phr) | 12.81 |
| 25.3% solids, 900-960 cps | 100.00 |
| Example 3 | |
| Xylene | 34.2 |
| MEK | 34.0 |
| FPC-471 Vinyl Resin | 20.0 |
| Plastholl ESO | 0.3 |
| Thermalite 31 | 0.1 |
| Tricresyl Phosphate (10 phr) | 2.0 |
| Anti-Terra U | 0.2 |
| Alcon Aluminum Paste 465 (30 phr) | 9.2 |
| | 100.00 |

Of particular interest for the aluminum colored PVC plastic parts is its usage on fitting covers and jacketing for insulated pipes and tanks. These aluminum colored fitting covers match up very well with aluminum jacketing, or the aluminum jacketing can be replaced entirely with the aluminum colored plastic, providing the same pleasing appearance and long term durability at a much lower cost. The aluminum coating provides improved chemical resistance of the plastic part, as well as keeping the temperature of the surface low for improved thermal efficiency when used over insulated cold piping. The impact resistance of the plastic is improved as much as 50% due to the reinforcing property of the coating. Flammability of the plastic is also reduced due to the heat reflecting property of the aluminum coating slowing the spread of flames.

Testing of Examples 1-3

The coatings in Examples 1-3 were applied to rigid PVC at 1, 2, and 3 mils dry film thickness by spray and air dried. The sheets were then thermoformed into fitting covers which provided a uniform colored coating with exceptional abrasion resistance that was impossible to separate off the plastic substrate.

The coated PVC sheet (20 to 25 mils in thickness) was bent 180° back on itself without any loss of adhesion or color in the crease mark. The coated PVC was also exposed to −40° F. and 350° F. with no adverse effects. The coated PVC plastic sheet was also bent to fracture at −40° F. with no adverse effects seen on the coated surface. Typically, a coating would crack and/or flake off under such tests if it was not fused to the surface of the PVC.

The same aluminum coated PVC sheets at 25 mils thickness were impacted with a Gardener reverse impact tester, with the aluminum coating facing the impacter. The uncoated PVC sheets had an impact resistance of 23 inch-lbs. while the coated PVC sheets had an impact resistance of 30-40 inch-lbs. depending on the dry film thickness of the coating (1, 2, and 3 mils tested). There was no disbondment of the coating in the impacted area from these tests.

The following Examples (4-5) are coating compositions prepared with pigments other than aluminum.

| Example 4 | |
|---|---|
| Xylene | 30.8 |
| MEK | 30.0 |
| Cyclohexanone | 10.0 |
| Plastholl ESO | 0.3 |
| Drewfax 0007 (Dispersant) | 0.3 |
| VYHH Vinyl Resin (PVC, vinyl acrylate) | 20.0 |
| TiO$_2$ | 5.0 |
| Tinuvin 292 (UV-light absorber/stabilizer) | 0.2 |
| Multiflow (Leveling-gloss Agent) | 0.4 |
| Stan-Tone ® 40 PC-03 Blue Paste | 3.0 |
| | 100.00 |
| Example 5 | |
| Methyl Isobutyl Ketone (MIBK) | 25.0 |
| Xylene | 5.0 |
| Kronitex 100 (phosphate plasticizer) | 1.9 |
| Drewplus 0007 (dispersant aid for TiO$_2$ sulf anionic) | 0.2 |
| Plastholl ESO | 0.3 |
| FPC-471 Vinyl Resin | 19.0 |
| Uritane OR-600 (TiO$_2$) | 5.0 |
| Shear at low speed until all resin dissolved, then high shear to Hegman 8 | |
| Methyl Isoamyl Ketone (MIAK) | 10.0 |
| Multiflow | 0.4 |
| Anti-foam A (silicone) | 0.02 |
| 40 PC-03 Blue | 1.10 |
| 25 PC-04 Red | 2.30 |
| Xylene | 29.78 |
| Blend uniform | 100.00 |
| Wt. Solids: | 30.0% ± 1% |
| Volume Solids: | 20.3% |
| Viscosity 2/50/77: | 127 cps ± 15 cps |
| Wt./gal. | 7.93 lbs. ± 0.2 |
| Coverage Rate | 0.5 mils dry. 650 ft$^2$/gal. |

Examples 6–9 are aluminum coating compositions prepared with various polymers that were applied to different types of thermoplastic substrates.

| Example 6 PVC Copolymer/Aluminum | |
|---|---|
| MIBK | 26.7 |
| Xylene | 5.0 |
| Kronitex 100 | 1.8 |
| Plastholl ESO | 0.3 |
| FPC-471 Vinyl Resin | 18.0 |
| Blend until all vinyl dissolved | |
| Multiflow | 0.4 |
| Alcon Aluminum Paste 465 | 9.0 |
| MIAK | 9.0 |
| Xylene | 29.8 |
| Blend uniform | 100.0 |
| Wt. Solids: | 26.2% |
| Volume Solids: | 16.8% |
| Viscosity 2/50/75° F. | 90–120 cps |
| Wt./gal. | 7.8 ± 0.2 lbs. |
| Coverage Rate | 535 ft$^2$/gal. for 3 mils wet, 0.5 mils dry |
| Example 7 Acrylic Resin/Aluminum | |
| Xylene | 39.6 |
| MEK | 20.0 |
| MIAK | 10.0 |
| Multiflow | 0.4 |
| Elvacite Resin 2009 (Methyl Methacrylate) | 20.0 |
| Alcon Aluminum Paste 465 | 10.0 |
| Blend Uniform | 100.0 |
| Viscosity: | 2/50/75° F. 90–100 cps |
| Wt. Solids: | 28.7% |
| Volume Solids: | 20.3% |
| Wt./Gal.: | 7.82 lbs. |
| Coverage Rate: | 400–600 ft.$^2$/gal., 0.5–0.8 mils dry |
| Examples 8 and 9: High Styrene Copolymers/Aluminum | | |
|  | Example 8 | Example 9 |
| Xylene | 57.6 | 57.6 |

| -continued | | |
|---|---|---|
| MIAK | 10.0 | 10.0 |
| Multiflow | 0.4 | 0.4 |
| Kronitex 100 | 2.0 | 2.0 |
| Aluminum Flake 6205 | 10.0 | 10.0 |
| Pliolite AC High Styrene-Acrylate Resin | 20.0 | — |
| Pliolite S5B High Styrene-Butadiene Resin | — | 20.0 |
| | 100.0 | 100.0 |
| Viscosity 3/50/75 | 165 cps | 162 cps |
| Wt. Solids | 28.7% | 28.7% |
| Wt./Gal. | 7.81 lbs. | 7.82 lbs. |
| Volume Solids | 22.2% | 22.0% |
| Coverage Rate ft$^2$/gal. | 400–600 | 400–600 |

Table III summarizes the results of applying the coatings of Examples 6–9 to different thermoplastic substrates using the method of the invention.

As Table II shows, fusion between the coating and plastic substrate can be achieved when the resin used in the coating is very similar to the plastic substrate, or highly compatible with it. On the other hand, where there was a dissimilarity between the substrate and coating polymers, fusion was not achieved.

TABLE III
Alternate Coating/Plastic Systems
Compatibility*/Adhesion/Fusing*
Plastic Substrate

| Coating | Acrylic | ABS | Polystyrene | PVC |
|---|---|---|---|---|
| Example 6 PVC Copolymer | Good/ Good/ None | Poor/ Good/ None | Poor/ Poor/ None | Excellent/ Excellent/ Fused |
| Example 7 Acrylic Resin | Excellent/ Excellent/ Fused | Excellent/ Excellent/ Fused | Good/ Good/ None | Excellent/ Excellent/ Fused |
| Example 8 High Sytrene-Acrylic Copolymer | Poor/ Excellent/ None | Unknown/ Excellent/ None | Excellent/ Excellent/ Fused | Fair/ Good/ None |
| Example 9 High Styrene-Butadiene Copolymer | Poor/ Excellent/ None | Unknown/ Excellent/ None | Excellent/ Excellent/ Fused | Fair/ Good/ None |

*Compatibility of resin used in coating with plastic, or the ability to blend the resin into the plastic to modify its properties.
**The degree of adhesion of the applied coating to the plastic after 10 minutes in the oven at the processing temperature of given plastic (350° F. for acrylic, 300° F. for all others).
***The fusing of the coating to the plastic surface so it cannot be scraped or lifted off after 10 minutes in the oven at the processing temperature.

Testing of Examples 6–9

Determination of whether or not the coating compositions of Examples 6–9 actually fused to the plastic substrate was determined by three methods, which were:

1. Scratching the coating through to the plastic substrate with a sharp metal object in an attempt to lift it off of the surface. Where the coating had fused to the surface, it was impossible to flake off any of the coating. The coating could only be removed by scratching down through the coating and the surface of the plastic so that a deep scratch was left in the plastic, with no lifting of the coating on either side of the scratch.

2. Coated samples were placed in boiling water for 4 hours and then evaluated for blistering, flaking, cracking, or loss of adhesion. Of the coatings that fused there was no evidence of loss of adhesion, but in most cases it appeared to be only tougher and more difficult to scratch.

3. Coated samples were tested by the Gardner Falling Ball Method, impacting on the back side of the plastic. There was no loss of adhesion of the coating in any of the Examples where the coating fused to the surface of the plastic sheet even though it was impacted to the shattering point.

Other resins may also fuse to a given plastic even if they are not similar to the plastic if they prove to have good compatibility and are thermoplastic. This is evidently the case with acrylic resin (in Example 7) fusing to the ABS and PVC plastic sheets (see Table III). Other resin possibilities dissimilar to the plastic substrate for use in coating compositions include chlorinated rubber, chlorinated polyethylene, or chlorinated polyvinyl chloride.

While the invention has been described and fully explained in the detailed description of the specification and preferred embodiments, many embodiments of the invention can be made without departing from the spirit and scope of the invention.

I claim:

1. A method of thermoforming a thermoplastic substrate, with the simultaneous formation of an integral coating on a surface of said thermoplastic substrate, which method comprises the steps of:
   (a) applying to said surface of said thermoplastic substrate a pigmented thermoplastic polymeric coating composition comprising:
      (i) a compatible thermoplastic polymer compatible with said thermoplastic substrate;
      (ii) a pigment; and
      (ii) a major proportion of a solvent;
      wherein said coating composition forms a solvent-free discrete coating on said thermoplastic substrate; and
   (b) heating the coated thermoplastic substrate to the thermoforming temperature of said thermoplastic substrate and said compatible thermoplastic polymer;
wherein said thermoplastic substrate and said coating composition become intimately bonded and thermally fused during a thermoforming operation at the interface between said substrate and said coating.

2. The method of claim 1 wherein said thermoplastic substrate comprises a vinyl polymer having a molecular weight of about 50,000–350,000.

3. The method of claim 2 wherein said thermoplastic substrate comprises a polyvinyl chloride polymer, a polymethyl methacrylate polymer, or a polystyrene polymer.

4. The method of claim 1 wherein said thermoplastic substrate comprises a copolymer of acrylonitrile, butadiene, and styrene (ABS).

5. The method of claim 1 wherein said coating composition comprises about 15–30% of a compatible thermoplastic vinyl polymer having a molecular weight of about 25,000–150,000.

6. The method of claim 5, wherein said compatible thermoplastic polymer comprises polyvinyl chloride, polymethyl methacrylate, ABS, or polystyrene.

7. The method of claim 1 wherein said compatible thermoplastic polymer of said coating composition comprises chlorinated rubber, chlorinated polyethylene, or chlorinated polyvinyl chloride.

8. The method of claim 1 wherein said pigment is present in said coating composition at a concentration of about 3–20% and is heat and light stable.

9. The method of claim 8 wherein said pigment of said coating composition comprises metal flake, organic pigment, inorganic pigment, or mixtures thereof.

10. The method of claim 1 wherein said solvent is present in said coating composition at a concentration of about 60–85% forming a true solution with said compatible thermoplastic polymer.

11. The method of claim 1 wherein said solvent of said coating composition comprises cyclohexanone, methyl ethyl ketone, methyl amyl ketone, methyl isoamyl ketone, methyl isobutyl ketone, xylene, toluene, chlorinated solvents, acetates, or dimethylformamide.

12. The method of claim 1 wherein said coating composition is curtain coated, sprayed or roll coated onto said surface of said thermoplastic substrate.

13. The method of claim 1 wherein said discrete coating has a thickness of about 1–15 mils when we and a thickness of about 0.2–4 mils when dry.

14. The method of claim 1 wherein said coating composition has a viscosity of about 70–1,000 cps.

15. The method of claim 1 wherein said coated thermoplastic substrate is heated by a process comprising radient heat rods, oven heating or microwave heating.

16. The method of claim 1 wherein said coated thermoplastic substrate is heated to a temperature of about 200°–720° F.

17. The method of claim 1 wherein said coated thermoplastic substrate is heated to a temperature of about 260°–30020 F.

18. A method of thermoforming a polyvinyl chloride substrate, with the simultaneous formation of an integral coating on a surface of said polyvinyl chloride substrate, said method comprising the steps of:
   (a) applying to said surface of said polyvinyl chloride substrate a pigmented thermoplastic polymeric coating composition comprising:
      (i) a thermoplastic polymer compatible with polyvinyl chloride;
      (ii) a pigment; and
      (iii) a major proportion of a solvent;
      wherein said coating composition forms a solvent-free discrete coating on said polyvinyl chloride substrate; and
   (b) heating the coated polyvinyl chloride substrate to the thermoforming temperature of said polyvinyl chloride substrate and said solvent-free coating composition; wherein said polyvinyl chloride substrate and said coating composition become intimately bonded and thermally fused during a thermoforming operation at the interface between said substrate and said coating.

19. The method of claim 18 wherein said polyvinyl chloride substrate has a molecular weight of about 50,000–350,000.

20. The method of claim 18 wherein said thermoplastic polymer of said coating composition is present at a concentration of about 15–30% and has a molecular weight of about 25,000–150,000.

21. The method of claim 18 wherein said thermoplastic polymer of said coating composition comprises polyvinyl chloride, chlorinated polyvinyl chloride, chlorinated rubber, chlorinated polyethylene, or acrylic.

22. The method of claim 18 wherein said pigment is present in said coating composition at a concentration of about 3–20% and is heat and light stable.

23. The method of claim 22 wherein said pigment of said coating composition comprises metal flake, organic pigment, inorganic pigment, or mixtures thereof.

24. The method of claim 18 wherein said solvent is present in said coating composition at a concentration of about 60 to 85% forming a true solution with said thermoplastic polymer.

25. The method of claim 24 wherein said solvent of said coating composition comprises cyclohexanone, methyl ethyl ketone, methyl amyl ketone, methyl isoamyl ketone, methyl isobutyl ketone, xylene, toluene, chlorinated solvents, acetates, or dimethylformamide.

26. The method of claim 18 wherein said coating composition is curtain coated, sprayed or roll coated onto said surface of said polyvinyl chloride substrate.

27. The method of claim 18 wherein said discrete coating has a thickness of about 1–15 mils when wet and a thickness of about 0.2–4 mils when dry.

28. The method of claim 18 wherein said coating composition has a viscosity of about 70–1,000 cps.

29. The method of claim 18 wherein said coated polyvinyl chloride substrate is heated to a temperature of about 260°–300° F.

* * * * *

UNITED STATES PATENT AND TRADEMARK OFFICE
CERTIFICATE OF CORRECTION

PATENT NO. : 5,268,203
DATED : December 7, 1993
INVENTOR(S) : Vernon H. Batdorf

It is certified that error appears in the above-identified patent and that said Letters Patent is hereby corrected as shown below:

Column 15, claim 1, line 38, insert --through evaporation of said solvent-- after the word "substrate".

Column 15, line 35, "(ii)" should read --(iii)--.

Column 16, claim 17, line 32 "30020F." should read --(iii)--.

Signed and Sealed this

Ninth Day of August, 1994

Attest:

BRUCE LEHMAN

Attesting Officer

Commissioner of Patents and Trademarks